United States Patent [19]

Pasmanik et al.

[11] Patent Number: 5,666,260
[45] Date of Patent: Sep. 9, 1997

[54] DEVICE AND METHOD FOR INSULATING AN ELECTRICAL COMPONENT

[75] Inventors: Yury Pasmanik, Glenview; Bruce E. Blair, Elmhurst, both of Ill.

[73] Assignee: Philips Electronics North America, New York, N.Y.

[21] Appl. No.: 575,800

[22] Filed: Dec. 22, 1995

[51] Int. Cl.⁶ ............................................. H02B 1/00
[52] U.S. Cl. .................. 361/600; 174/137 R; 174/138 R; 174/138 F; 361/437; 361/500; 361/674; 361/811; 361/812; 361/821; 439/892; 439/893
[58] Field of Search ................. 174/71 R, 72 A, 174/91–92, 136, 137 R, 138 R, 138 F, DIG. 2; 336/107, 90, 65, 192; 361/437, 517–519, 521, 535–537, 539, 674, 783, 811, 812, 821; 439/135, 138, 146–147, 296, 299, 304, 367, 369, 521, 528, 718, 750, 830, 892–893

[56] References Cited

U.S. PATENT DOCUMENTS 3,916,082  10/1975  Gillemot ..................... 174/72 A
4,841,413   6/1989  Mizerak ...................... 361/807

*Primary Examiner*—Gregory D. Thompson
*Attorney, Agent, or Firm*—Edward Blocker

[57] ABSTRACT

A tubular shaped device for insulating an electrical component such as, but not limited to, a dry film capacitor. Along one edge of the device is a rectangular shaped cutout for receiving radially extending leads of the electrical component. The electrical component is secured within the device by spreading the device open, placing the electrical component within the spread-open device, positioning the leads of the electrical component within the cutout and finally permitting the device to once again assume its tubular shape.

21 Claims, 2 Drawing Sheets

DEVICE AND METHOD FOR INSULATING AN ELECTRICAL COMPONENT

BACKGROUND OF THE INVENTION

This invention relates generally to a device and method for insulating an electrical device, and more particularly to a device and method for insulating a substantially cylindrical electrical device such as, but not limited to a dry film capacitor, having leads extending radially from each end of the device.

Conventional ballast circuitry typically includes a dry film capacitor connected to a secondary winding of a transformer. The capacitor is insulated, that is, electrically isolated, from the conductive ballast enclosure (i.e. ballast can). A typical insulator is formed from a flexible film or sheet dielectrics fastened directly to the device using adhesive tapes. Pressure sensitive adhesive tapes applied directly to the capacitor can be used in lieu of the flexible film or sheet dielectrics. Diecut and folded insulators in box-like configurations also can be used for isolating the capacitor from contact with the ballast enclosure. For economic reasons, the material of choice is often an electrical grade of paper which has the undesirable attribute of high water absorbtion. Such absorbtion can significantly degrade the performance of the finished ballast.

The cost of fabricating and postforming the insulators and/or labor in precisely positioning the insulator relative to the capacitor within the ballast enclosure can be extremely expensive. An undesirable increase in manufacturing cost can result. Paper inserts and cardboard boxes are also capable of absorbing moisture from the air. Such absorption before potting and from tar after potting can detrimentally affect the capacitive properties of the capacitor thereby shortening its effective life expectancy.

It is therefore desirable to provide an improved device and method for insulating an electrical device which is easier and requires less time to assemble and is relatively inexpensive to manufacture as compared to conventional insulating devices. The improved device and method should be especially designed for insulating a substantially cylindrical electrical component having leads extending in a radial direction therefrom.

SUMMARY OF THE INVENTION

Generally speaking, in accordance with a first aspect of the invention, an insulator includes a substantially cylindrical exterior characterized by a major axis, a substantially cylindrical hollow interior, a first open end and a second open end and a passageway disposed along the cylindrical exterior and in spatial communication with the cylindrical hollow interior.

The assembly, in accordance with the invention, overcomes both the moisture absorption problem of paper and the time consuming, labor intensive drawback of paper and plastic wrap in insulating a substantially cylindrical electrical component. The insulator, which has a substantially tubular shape, does not absorb moisture and can be easily and quickly connected to the electrical component for insulating the latter.

The passageway preferably is distanced away from both the first open end and the second open end and extends in a direction parallel to the major axis. It is a feature of this first aspect of the invention that the passageway is substantially centered along the length of the cylindrical exterior and forms a substantially rectangular slot. The insulator typically is made from a thermoplastic material.

It is another feature of this first aspect of the invention that the insulator further include a pair of slits disposed along the cylindrical exterior, in spatial communication with the cylindrical hollow interior and extending along the same plane in a direction parallel to the major axis. Each slit is in spatial communication between the passageway and one of the two open ends of the insulator.

In accordance with a second aspect of the invention, a device in combination with and for insulating a substantially cylindrical electrical component having leads extending radially from a first end and a second end of the component includes a cylindrical exterior characterized by a major axis, a cylindrical hollow interior for receiving and supporting the electrical component, a first open end and a second open end and a passageway disposed along the cylindrical exterior and in spatial communication with the hollow interior through which the leads of the electrical component extend. The passageway includes a first end wall and a second end wall for limiting movement of the leads in directions parallel to the major axis.

It is a feature of this second aspect of the invention that the distance from the first open end to the second open end of the device is greater than the distance from the first end to the second end of the electrical component as measured in a direction parallel to the major axis. The distance from the first end wall to the second end wall of the passageway is also greater than the distance from the first end to the second end of the electrical component as measured in a direction parallel to the major axis.

It is another feature of this second aspect of the invention that the device further include a first end portion extending between the first end wall of the passageway and the first open end of the device and a second end portion extending between the second end wall of the passageway and the second open end of the device. The first end portion and the second end portion extend in directions which are parallel to the major axis and beyond the first end and the second end of the electrical component, respectively. Each of these end portions enclose air gaps between one of the two ends of the electrical component and an open end of the device so as to provide additional insulation therebetween.

The passageway further includes a transverse wall extending in a direction substantially parallel to the major axis against which the leads rest. The end walls of the passageway extend in a direction substantially perpendicular to the major axis.

In accordance with a third aspect of the invention, a method of insulating a substantially cylindrical electrical component having leads extending radially from a first end and a second end of the component includes the steps of spreading open a tubular shaped insulator which is characterized by a major axis, placing the electrical component within the insulator and positioning the leads within a slot formed along an edge of the insulator. The edge extends in a direction substantially parallel to the major axis of the insulator. The method also includes the step of permitting the insulator to once again assume its tubular shape whereby the electrical component rests within and is encircled by the insulator. In positioning the leads, the component is typically rotated relative to the insulator until the leads are both within the slot and in contact with a wall of the slot which extends in a direction parallel to the major axis of the insulator.

Accordingly, it is an object of the invention to provide an improved device and method for insulating a substantially cylindrical electrical component having leads extending radially therefrom which minimizes manufacturing cost and is relatively easy to assemble.

It is another object of the invention to provide an improved device and method for insulating a dry film capacitor in which the moisture absorption problems encountered by paper insulators is substantially eliminated.

It is a further object of the invention to provide an improved device and method for insulating a dry film capacitor in which the time consuming, labor intensive requirements of conventional insulating devices is substantially eliminated.

Still other objects and advantages of the invention will, in part, be obvious, and will, in part, be apparent from the specification.

The invention accordingly comprises several steps and the relation to one or more such steps with respect to each of the other, and the device embodying features of construction, combination of elements and arrangements of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in combination with the accompanying drawings, in which.

BRIEF DESCRIPTION OF THE PREFERRED EMBODIMENT

Figure 1:
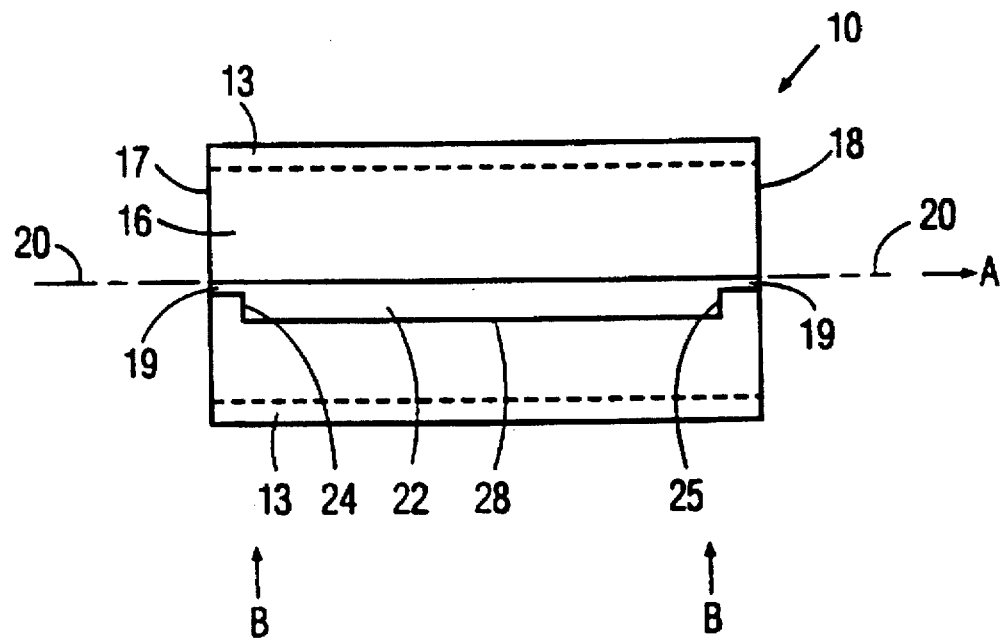
FIG. 1 is a side elevational view of an insulator in accordance with the invention.

As shown in FIG. 1, an insulator 10 has a substantially tubular shape and is characterized by a major axis 20. Insulator 10, which includes a substantially cylindrical exterior 13, a substantially cylindrical hollow interior 16 and a pair of open ends 17 and 18, is formed from an extrusion process in which a thermoplastic material is melted and forced through a tubular shaped die. The tubular shaped extruded thermoplastic material after being permitted to cool down and solidify is cut into a plurality of sections, each of which serves as an insulator 10.

Figure 3:
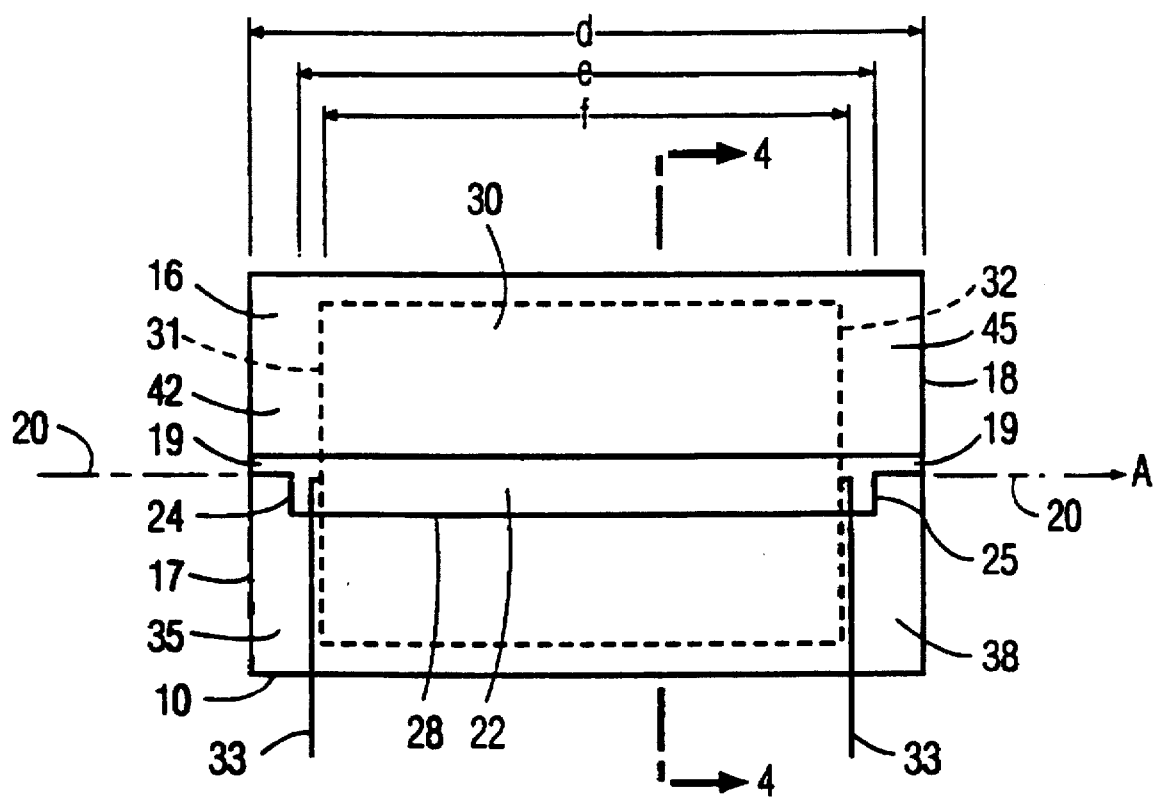
FIG. 3 is a side elevational view of the insulated electrical component taken along the lines 3—3 of FIG. 2.

Either during or after the extrusion process a pair of slits 19 and a passageway 22 is formed in each insulator 10. Slits 19 and passageway 22 are positioned along exterior 13 and extend from exterior 13 to interior 16. Slits 19 extend along the same plane in a direction parallel to the direction of major axis 20 as denoted by an arrow A. As shown in FIG. 3, once an electrical component such as, but not limited to, a dry film capacitor 30 is properly positioned within insulator 10, each slit 19 is in spatial communication between passageway 22 and a respective one of open ends 17 and 18. Capacitor 30 includes a pair of ends 31 and 32 and a pair of leads 33 extending radially from ends 31 and 32. Slits 19 and passageway 22 with the capacitor 30 properly positioned within insulator 10 are each in spatial communication with exterior 13 and interior 16.

Passageway 22 is distanced away from both open end 17 and open end 18, extends in a direction parallel to the direction of major axis 20 (i.e. denoted by arrow A) and is substantially centered along the length of exterior 13. As shown in FIGS. 1 and 3, passageway 22 forms a substantially rectangular slot with a pair of end walls 24 and 25 and a transverse wall 28. End walls 24 and 25 extend in a direction denoted by arrows B (FIG. 1) which is substantially perpendicular to the direction of major axis 20. Transverse wall 28 extends in the same direction as arrow A, that is, substantially parallel to the direction of major axis 20.

Figure 2:
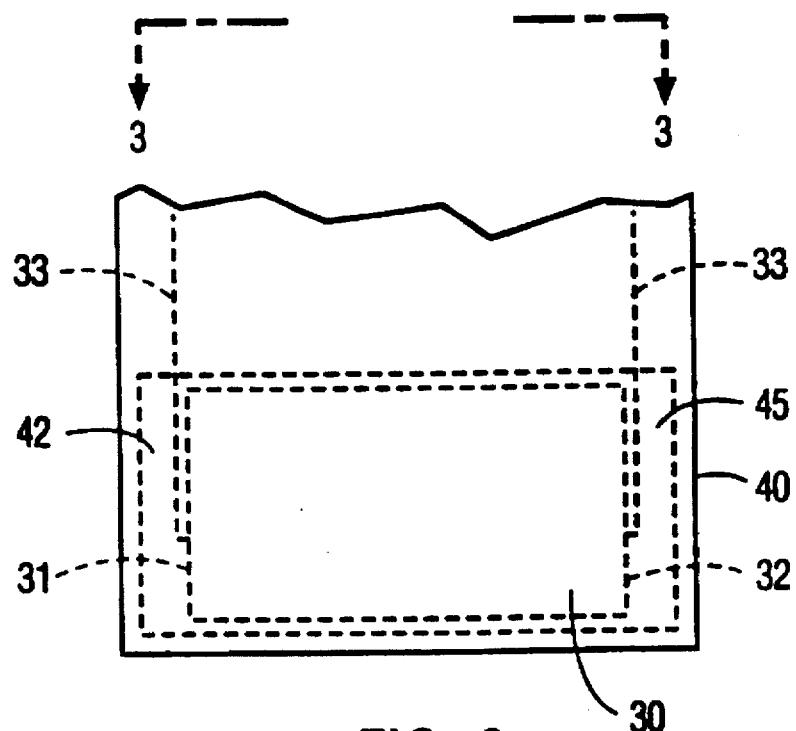
FIG. 2 is a top plan view of an insulated electrical component positioned within a fragmented ballast can in accordance with the invention.
Figure 4:
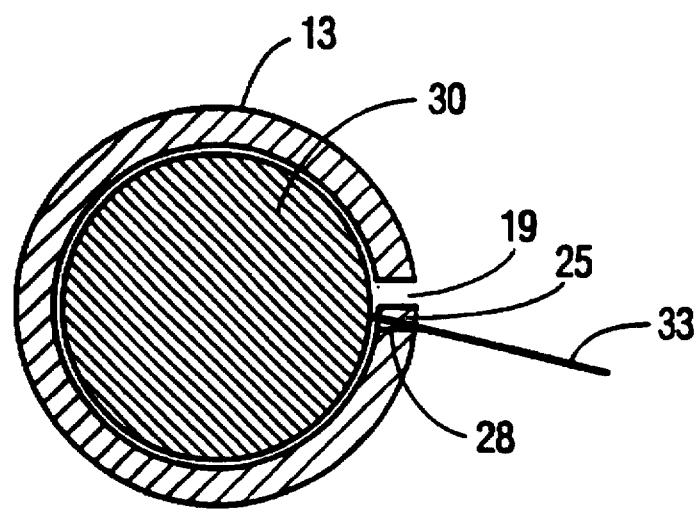
FIG. 4 is a sectional view of the insulated electrical component taken along the lines 4—4 of FIG. 3.

Referring now to FIGS. 2, 3 and 4, a substantially cylindrical electrical component such as capacitor 30 is insulated from and within a housing such as, but not limited to, a ballast can 40 by first spreading open insulator 10 so as to sufficiently enlarge slits 19 and passageway 22 to permit capacitor 30 to pass therethrough. Once capacitor 30 has been placed within insulator 10, leads 33 are positioned within passageway 22. Capacitor 30 is typically rotated relative to insulator 10 until one or both of the two leads 33 come into contact with transverse wall 28. Insulator 10 is then permitted to once again assume its substantially tubular shape whereby capacitor 30 rests within and is encircled by insulator 10. Generally, the diameter of hollow interior 16 is slightly smaller than the diameter of the cylindrically shaped electrical component resulting in a relative snug fit therebetween.

Although a thermoplastic material is generally used, insulator 10 can be made from other materials provided their electrical insulating properties are acceptable and memories are sufficient to regain their tubular shape after being stretched open. When a thermoplastic material is to be used for insulator 10 within ballast can 40, the thermoplastic material is preferably of an extrusion grade and has an adequate temperature resistance to withstand the temperatures of an asphalt fill operation (i.e. in disposing of potting material within ballast can 40).

As shown in FIG. 3, the length of insulator 10 as measured by a distance d is greater than the length of capacitor 30 as measured by a distance f. Distances d and f extend from open end 17 to open end 18 of insulator 10 and from end 31 to end 32 of capacitor 30, respectively, in the direction of major axis 20, that is, in the direction denoted by arrow A. The length of passageway 22 as measured by a distance e is less than distance d but greater than distance f. Distance e extends between end walls 24 and 25 in the direction of major axis 20. A pair of air gaps 35 and 38 exist between end 31 and open end 17 and between end 32 and open end 18 within interior 16 of insulator 10, respectively. By distancing ends 31 and 32 and leads 33 from open ends 17 and 18, additional insulation is provided between the sides of capacitor 30 and ballast can 40. A pair of portions 42 and 45 of insulator 10 encompass air gaps 35 and 38. Portion 42 extends between end wall 24 and open end 17. Portion 45 extends between end wall 25 and open end 18. When insulator 10 is used within ballast can 40 these air gaps are typically displaced (i.e. filled) with potting material.

End walls 24 and 25 serve as stops to leads 33 so as confine movement of capacitor 30 in directions parallel to the direction of major axis 20. In other words, sideways displacement of capacitor 30 is restrained by the limited movement of leads 33 within passageway 22. Leads 33 are normally near or in contact with transverse wall 28. Any movement of capacitor 30 in directions parallel to the direction of major axis 20 often result in leads 33 traveling deep into one of the two corners of passageway 22 (i.e. where transverse wall 28 meets end wall 24 or end wall 25).

As can now be readily appreciated, a substantially cylindrical electrical component having leads extending radially therefrom can be easily and quickly positioned within insulator 10. As compared to conventional insulating methods, the method of insulating an electrical component such as capacitor 30 in accordance with the invention can be accomplished in less time and at a relatively low manufacturing cost and requires less physical labor.

It will thus be seen that the objects set forth above, among those made apparent from the preceding description, are efficiently attained and since certain changes may be made in the above construction without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. An insulation device in combination with and for insulating a substantially cylindrical capacitive component having leads extending radially from a first end and a second end of the capacitive component, the insulation device comprising:

a cylindrical insulation exterior characterized by a major axis;

a cylindrical hollow interior for receiving and supporting the capacitive component, wherein the cylindrical hollow interior is of a diameter substantially equal to an outer diameter of the cylindrical capacitive component;

a first open end and a second open end; and a passage disposed along the cylindrical exterior and in spatial communication with the hollow interior through which passageway the leads of the capacitive component extend, said passageway including a first end wall and a second end wall for limiting movement of the leads in directions parallel to the major axis.

2. The device of claim 1, wherein the passageway is distanced away from both the first open end and the second open end and extends in a direction parallel to the major axis.

3. The device of claim 2, further including a pair of slits disposed along the cylindrical exterior, in spatial communication with the cylindrical hollow interior and extending along the same plane in a direction parallel to the major axis; each slit being in spatial communication between the passageway and a respective one of the two open ends.

4. The device of claim 3, wherein the distance from the first open end to the second open end of the device is greater than the distance from the first end to the second end of the capacitive component as measured in a direction parallel to the major axis.

5. The device of claim 2, wherein the distance from the first end wall to the second wall of the passageway is greater than the distance from the first end to the second end of the capacitive component as measured in a direction parallel to the major axis.

6. The device of claim 5, further including a first end portion extending between the first end wall of the passageway and the first open end of the device and a second end portion extending between the second end wall of the passageway and the second open end of the device wherein the first end portion and the second end portion extend in directions which are parallel to the major axis and beyond the first end and the second end of the capacitive component, respectively.

7. The device of claim 1, wherein the passageway forms a substantially rectangular slot that extends to the first and second end wall thereof.

8. The device of claim 7, wherein the insulation device is made from a thermoplastic material.

9. The device of claim 1, wherein the distance from the first open end to the second open end of the device is greater than the distance from the first end to the second end of the capacitive component as measured in a direction parallel to the major axis.

10. The device of claim 1, wherein the passageway comprises a rectangular slot that extends parallel to the major axis and the distance from the first end wall to the second end wall of the rectangular slot passageway is greater than the distance from the first end to the second end of the capacitive component as measured in a direction parallel to the major axis.

11. The device of claim 1, wherein the passageway further includes a transverse wall extending in a direction substantially parallel to the major axis against which the leads rest.

12. The device of claim 11, wherein each end wall of the passageway extends in a direction substantially perpendicular to the direction of the major axis.

13. The device of claim 3, wherein the passageway further includes a transverse wall extending in a direction substantially parallel to the major axis against which the leads rest; each end wall extending in a direction substantially perpendicular to the direction of the major axis and adjoining an inner end of a respective slit.

14. The device as claimed in claim 1 wherein the insulation device comprises a resilient material and the diameter of the cylindrical hollow interior is slightly smaller than an outer diameter of the cylindrical capacitive component.

15. The device as claimed in claim 1 wherein an outer wall of the cylindrical capacitive component contacts the hollow interior of the insulation device at least between the end walls of said passageway.

16. The device as claimed in claim 3 wherein the passageway comprises a substantially rectangular slot of uniform width up to a point of contact with an inner edge of at least one slit and said end walls thereof adjoin respective inner edges of the pair of slits.

17. The device of claim 15, wherein the passageway is substantially centered along the length of the cylindrical exterior.

18. A method of insulating a substantially cylindrical electrical component having leads extending radially from a first end and a second end of the component, comprising the steps of:

spreading open a tubular shaped resilient insulation device which is characterized by a major axis;

placing the electrical component coaxially within the device;

positioning the leads within a slot formed along an edge of the device, the edge extending in a direction substantially parallel to the major axis of the device; and permitting the device to once again assume its tubular shape whereby the electrical component rests within and is encircled by the device with an outer wall of the electrical component in contact with an inner wall of the tubular shaped device substantially throughout the entire length of the cylindrical electrical component.

19. The method of claim 18, wherein the step of positioning includes rotating the component relative to the device until the leads are both within the slot and in contact with a wall of the slot which extends in a direction parallel to the major axis of the device.

20. An insulation device in combination with and for insulating a substantially cylindrical capacitive component having leads extending radially from a first end and a second end of the capacitive component, the insulation device comprising:

a cylindrical insulation exterior characterized by a major axis;

a cylindrical hollow interior for receiving and supporting the capacitive component;

the insulation device having a first open end and a second open end;

a passage way disposed along the cylindrical exterior and in spatial communication with the hollow interior through which passageway the leads of the capacitive component extend, said passageway including a first end wall and a second end wall for limiting movement of the leads in directions parallel to the major access; and wherein the distance from the first open end to the second open end of the device is greater than the distance between from the first end wall to the second end wall of the passageway which is greater than the distance from the first end to the second end of the capacitive component as measured in a direction parallel to the major axis.

21. The device of claim 20 wherein the passageway further includes a transverse wall extending in a direction substantially parallel to the major axis against which the leads rest; each end wall extending in a direction substantially perpendicular to the direction of the major axis.

* * * * *